United States Patent
Blank et al.

[11] Patent Number: 6,076,038
[45] Date of Patent: Jun. 13, 2000

[54] COMPUTER UNIT FOR A CONTROL DEVICE IN A MOTOR VEHICLE

[75] Inventors: Thomas Blank, Karlsruhe; Jochen Uhde, Hausen, both of Germany

[73] Assignee: Siemens Aktiengesellschaft, Munich, Germany

[21] Appl. No.: 09/233,280

[22] Filed: Jan. 19, 1999

Related U.S. Application Data

[63] Continuation of application No. PCT/DE97/01484, Jul. 14, 1997.

[51] Int. Cl.[7] .............................. G06F 7/02; G06F 13/14; F02D 41/10
[52] U.S. Cl. .............................. 701/115; 701/110; 701/45
[58] Field of Search .................................. 701/29, 35, 36, 701/45, 102, 103, 110, 115; 711/102, 103, 104; 395/682, 685

[56] References Cited

U.S. PATENT DOCUMENTS

| | | | |
|---|---|---|---|
| 4,677,558 | 6/1987 | Bohmler et al. | 701/115 |
| 5,138,548 | 8/1992 | Kienle | 701/115 |
| 5,638,272 | 6/1997 | Minowa et al. | 701/115 |
| 5,826,205 | 10/1998 | Koelle et al. | 701/115 |
| 5,938,716 | 8/1999 | Shutty et al. | 701/115 |
| 5,948,026 | 9/1999 | Beemer, II et al. | 701/115 |
| 5,978,727 | 11/1999 | Jones et al. | 701/115 |
| 5,983,156 | 11/1999 | Andrews | 701/115 |

FOREIGN PATENT DOCUMENTS

| | | |
|---|---|---|
| 0118922A2 | 9/1984 | European Pat. Off. . |
| 0392953A1 | 10/1990 | European Pat. Off. . |
| 3735005A1 | 4/1989 | Germany . |
| 4303774A1 | 9/1993 | Germany . |

*Primary Examiner*—Willis R. Wolfe
*Attorney, Agent, or Firm*—Herbert L. Lerner; Laurence A. Greenberg; Werner H. Stemer

[57] ABSTRACT

The computing unit generates an output signal for controlling a function of the motor vehicle. The processing specification that is stored in a ROM of the computing unit, and with which, in particular, a logic function is described, can be changed even after the ROM mask has been created. Instead of the logic function, a truth table which represents the logic function is stored in an EPROM of the computing unit. A processing specification is stored in the ROM with which calculated variables are compared with the truth table.

19 Claims, 4 Drawing Sheets

W1 (1) : KG1 = f (GG, KGP)
W1 (2) : KG2 = f (GG, KGP)
W1 (3) : KG3 = f (GG, KGP)
W1 (4) : KG4 = f (GG, KGP)
W1 (5) : KG5 = f (GG, KGP)
W1 (6) : KG6 = f (GG, KGP)

AG = VG1 OR (VG2 AND VG3)

FOR i = 1 TO i = $2^N$
  (FOR j = 1 TO j = N
    (ZGj = (VGj == LPj (i))
    VE = ZGj AND ZG (j-1))
  IF VE == TRUE THEN AG = APi)

FIG.3a

| LP1 (i) | LP2 (i) | LP3 (i) | AP (i) | |
|---|---|---|---|---|
| 0 | 0 | 0 | 0 | i = 1 |
| 0 | 0 | 1 | 0 | i = 2 |
| 0 | 1 | 0 | 0 | i = 3 |
| 0 | 1 | 1 | 1 | i = 4 |
| 1 | 0 | 0 | 0 | i = 5 |
| 1 | 0 | 1 | 1 | i = 6 |
| 1 | 1 | 0 | 0 | i = 7 |
| 1 | 1 | 1 | 1 | i = 8 |

FIG.3b

| LP1 (i) | LP2 (i) | LP3 (i) | AP (i) | |
|---|---|---|---|---|
| 0 | 0 | 0 | 0 | i = 1 |
| 0 | 0 | 1 | 0 | i = 2 |
| 0 | 1 | 0 | 0 | i = 3 |
| 0 | 1 | 1 | 1 | i = 4 |
| 1 | 0 | 0 | 1 | i = 5 |
| 1 | 0 | 1 | 1 | i = 6 |
| 1 | 1 | 0 | 1 | i = 7 |
| 1 | 1 | 1 | 1 | i = 8 |

6,076,038

COMPUTER UNIT FOR A CONTROL DEVICE IN A MOTOR VEHICLE

CROSS-REFERENCE TO RELATED APPLICATION

This is a continuation of copending International Application PCT/DE97/01484, filed Jul. 14, 1997, which designated the United States.

BACKGROUND OF THE INVENTION

Field of the Invention

The invention lies in the automotive arts. Specifically, the invention relates to a computing unit in a motor vehicle that supplies an output variable for controlling a function of the motor vehicle in dependence on an input variable. The unit has a first, nonvolatile read-only memory and a second nonvolatile read/write memory. The first memory has stored therein first processing specifications for the calculation of characteristic variables as a function of the input variable and/or as a function of a characteristic-variable parameter, and second processing specifications for the calculation of logic comparison variables. The first and second processing specifications are stored on the basis of characteristic variables.

Computing units or arithmetic units that are used in motor vehicles and that supply an output variable for controlling a function of the motor vehicle—for example of an actuator—are well known: such computing units carry out, for example, the open-loop or closed-loop control of, say, an engine, a transmission, or a vehicle-occupant protection device. The computing unit is usually designed as a microcomputer which has a first, nonvolatile memory that is read only (ROM=Read Only Memory), and a second, nonvolatile memory that can be written to and read (EPROM=Erasable Programmable Read Only Memory), a volatile memory which can be written to and read (RAM=Random Access Memory) and a microprocessor and one or more inputs and outputs. Input variables—for example measurement variables—in the form of analog or digital signals are fed to the computing unit via the inputs. Output variables in the form of control signals are transmitted, for example, to actuators via the outputs. Such a computing unit is arranged, with numerous further electrical components, in a housing. In automotive technology, such a housing containing a control circuit is referred to by the term control device.

The computing unit according to the invention and the closest prior art are explained below in conjunction with the actuation of a vehicle-occupant protection system; however, the computing unit according to the invention is not in any way restricted to this specific application but can be used in any desired control devices of the motor vehicle.

A computing unit of an airbag control device according to FIG. 4 is known from commercial practice. The computing unit evaluates algorithmically, for example, one or more measured signals of acceleration sensors, as input variable EG, and passes on, when necessary, an output variable AG as a trigger signal, for example, to an airbag, a belt pretensioning device or some other restraining means in the vehicle.

Algorithmic processing specifications VV1, VV2, VV4 and VV5 are stored here in a first, nonvolatile read-only memory 1. The first memory 1 is preferably a ROM. A ROM which has once been filled with processing specifications VV can no longer be written to. The computing unit also contains an input 5 which receives the input variable/variables EG, an output 6 which outputs the output variable AG that controls, for example, the airbag. The unit further includes a second memory 2 (EPROM) which is nonvolatile but which is designed so that it can be written to and read, a third, volatile memory 3 (RAM) which is designed so that it can be written to and read, and a processor 4. The processor 4 executes the processing specifications VV which are stored in the first memory 1 and, in doing so, accesses the input variables EG and characteristic-variable parameters KGP stored in the second memory 2, and stores calculated variables in the third memory 3 and supplies output variables AG to the output 6. This computer-internal access to resources is expressed by the broken arrows starting from the processor 4.

In particular, the commercial prior art comprises a computing unit for triggering a vehicle-occupant protection system, in which unit one or more basic variables GG are calculated from one or more input variables EG using a fourth processing specification VV4 stored in the first memory 1 (FIG. 4). FIG. 2a shows six exemplary fourth processing specifications VV4(1) to VV4(6) for calculating six basic variables GG1 to GG6 from an input variable EG. The input variable EG is preferably the acceleration signal supplied by a sensor device for impact detection. The basic variables GG1 to GG6 are, for example, variables which are derived from the input variable EG, such as, for example, a speed acquired by integration of the acceleration, as first basic variable GG1, a basic variable GG2 acquired by double integration of the acceleration, an energy level of the acceleration signal acquired by squaring the acceleration, as basic variable GG3, a speed difference formed by forming the difference between the current speed value and the preceding one, as basic variable GG4, a forward displacement of the vehicle occupant calculated from the acceleration, as basic variable GG5, or a ripple factor calculated from the forward displacement of the vehicle occupant (dynamic of speed difference GG4), as basic variable GG6.

The calculated basic variables GG are stored in the third memory 3 and are used for subsequently calculating characteristic variables KG by means of first processing specifications VV1. Such characteristic variables KG may be, in the first instance, so-called triggering criteria which are compared below with the characteristic variables KG formed as threshold values. For example, according to FIG. 2b six characteristic variables KG1 to KG6 are calculated as a function of the calculated basic variables GG and as a function of the characteristic-variable parameters KGP. For example, the first characteristic variable KG1 is obtained from a multiplication of the first basic variable GG1 by a first characteristic-variable parameter KGP1 plus a multiplication of the second basic parameter GG2 by a second characteristic-variable parameter KGP2. A further characteristic variable KG, for example the fourth characteristic variable KG4, is equivalent to a further characteristic-variable parameter KGP, for example the characteristic-variable parameter KGP8.

The calculated characteristic variables KG are in turn stored in the third memory 3 before they are compared with one another by means of a second processing specification VV2 and as a result supply comparison variables VG which are in turn stored in the third memory 3. According to FIG. 2c, three comparison variables VG1, VG2, VG3 are calculated by in each case two of the six calculated characteristic variables KG being compared. The comparison variables VG preferably supply the binary values 0 or 1 and FALSE or TRUE as the result. Such a comparison variable VG supplies, for example, the information indicating whether the vehicle speed has exceeded a threshold which rises as time progresses.

An output variable AG is calculated by means of a fifth processing specification VV5 which is represented in FIG. 2d. The fifth processing specification VV5 is a logic function that logically links the calculated comparison variables VG by means of Boolean operators. The output variable AG is likewise conceived as a binary variable and assumes the value TRUE or FALSE. Thus, for example, the output variable AG according to FIG. 2d assumes the value TRUE if either the first comparison variable VG1 assumes the value TRUE, or simultaneously the second comparison variable VG2 and the third comparison variable VG3 have the value TRUE. If the output variable AG is TRUE, a signal which fires a vehicle-occupant protection system is emitted via the output 6 of the computing unit. The fifth processing specification VV5 supplies here the information indicating that an airbag is triggered if the vehicle speed exceeds a defined threshold value or if the dynamics of the speed difference exceed a further threshold value, and the forward displacement of the vehicle occupant has at the same time not yet exceeded a third threshold value.

The characteristic-variable parameters KGP in the second memory 2 can be easily changed and thus adapted, for example, to different vehicle types. The logic function, prescribed by the fifth processing specification VV5, of the triggering algorithm is, however, rigidly defined and can be changed only by creating a new ROM mask. Such a process, of course, is costly and time-consuming.

However, owing to ever shorter development cycles it is desirable to be able to change the logic structure of algorithm/processing specifications even if the ROM mask has already been created. It would be possible to develop the processing specifications right up to the time of introduction on a mass-production scale, improve them and implement them on the computing unit without incurring expenditure in terms of time and costs.

SUMMARY OF THE INVENTION

It is accordingly an object of the invention to provide a computing unit for a control device in a motor vehicle, which overcomes the above-mentioned disadvantages of the heretofore-known devices and methods of this general type and which permits, in particular, a processing specification to be changed after the ROM mask has been created.

With the foregoing and other objects in view there is provided, in accordance with the invention, a computing unit for a control device in a motor vehicle, comprising:

an input receiving an input variable and an output outputting an output variable for controlling a function of a motor vehicle in dependence on the input variable;

a first, nonvolatile, read-only memory having stored therein, on a basis of characteristic variables, first processing specifications for calculating characteristic variables as a function of one of the input variable and a characteristic-variable parameter, and second processing specifications for calculating logic comparison variables;

a second, nonvolatile memory capable of being written to and read from, the second memory having stored therein values of logic parameters; and the first memory having stored therein a third processing specification for comparing a respective logic comparison variable with a respective logic parameter for calculating the output variable.

In accordance with an added feature of the invention, each characteristic variable is dependent on at least one basic variable that depends on the input variable, and/or at least one characteristic-variable parameter.

In accordance with an additional feature of the invention, the second memory has stored therein the value of each characteristic-variable parameter.

In accordance with another feature of the invention, the first memory has stored therein a fourth processing specification for calculating each basic variable, wherein the basic variable is dependent on at least one input variable received by the computing unit.

Here, in order to calculate an output variable AG, a third processing specification with comparisons between in each case one of the calculated comparison variables and in each case one logic parameter is stored in the first memory. The logic parameter values are stored in the second memory.

Instead of the known logic function of the fifth processing specification in the first memory, only comparison routines which compare the set of comparison variables with a quantity of logic parameters are stored, as third processing specification, in the first memory. The values of the logic parameters may be changed as desired owing to their being stored in the second memory. Since the logic parameters, together with the unchanging third processing specification, represent the logic function of the known, fifth processing specification, the logic function which determines the output variable can be changed at any time without the third processing specification which is permanently located in the first memory having to be changed. The logic function determining the output variable AG can be easily changed in any desired way by changing the stored logic parameter values LP.

In accordance with further feature of the invention, the first memory is a ROM and the second memory is an EPROM, or a EEPROM.

In a preferred embodiment, the comparison variables, the logic parameters, and the output variable are binary variables.

In accordance with again an added feature of the invention, a logic output parameter is assigned to a set of logic parameters, and wherein the second memory has a value of the logic output parameter stored therein.

In accordance with again an additional feature of the invention, each logic parameter and/or each logic output parameter is a vector with at least two coordinates.

In accordance with again another feature of the invention, the values of the logic parameters and of the output parameter stored in the second memory form at least part of a truth table. In the alternative, values of the logic parameters and of the output parameter stored in the second memory form a complete truth table, wherein each logic parameter vector and the output parameter vector have $2^N$ coordinates (where N is equal to a number of the logic parameters).

In accordance with again a further feature of the invention, the third processing specification has comparisons logically linked to one another by an AND operation, and wherein a result of the AND operation is assigned to the output variable.

In a refinement, only comparisons between comparison variables and logic parameters of the same coordinate are taken into account, and wherein the output variable is assigned the value of the output parameter with the same coordinate if the result of the comparisons logically linked by AND operations is TRUE.

In accordance with yet an added feature of the invention, a processor for executing the processing specifications is connected to the first memory and the second memory, and a third, volatile read/write memory is connected to the processor for storing results calculated by the processor.

In accordance with yet another feature of the invention, the output is connected to a safety device in a motor vehicle and an output signal with the output variable triggers a restraining device in the vehicle.

In accordance with a concomitant feature of the invention, the input variable depends on the acceleration of the motor vehicle sensed by one or more acceleration sensors.

Other features which are considered as characteristic for the invention are set forth in the appended claims.

Although the invention is illustrated and described herein as embodied in a computing unit for a control device for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2a–2e show blocks with examples of processing specifications;

FIGS. 3a and 3b are two truth tables stored in the second memory of the computing unit.

DESCRIPTION OF THE PREFERRED EMBODIMENTS

Figure 1:
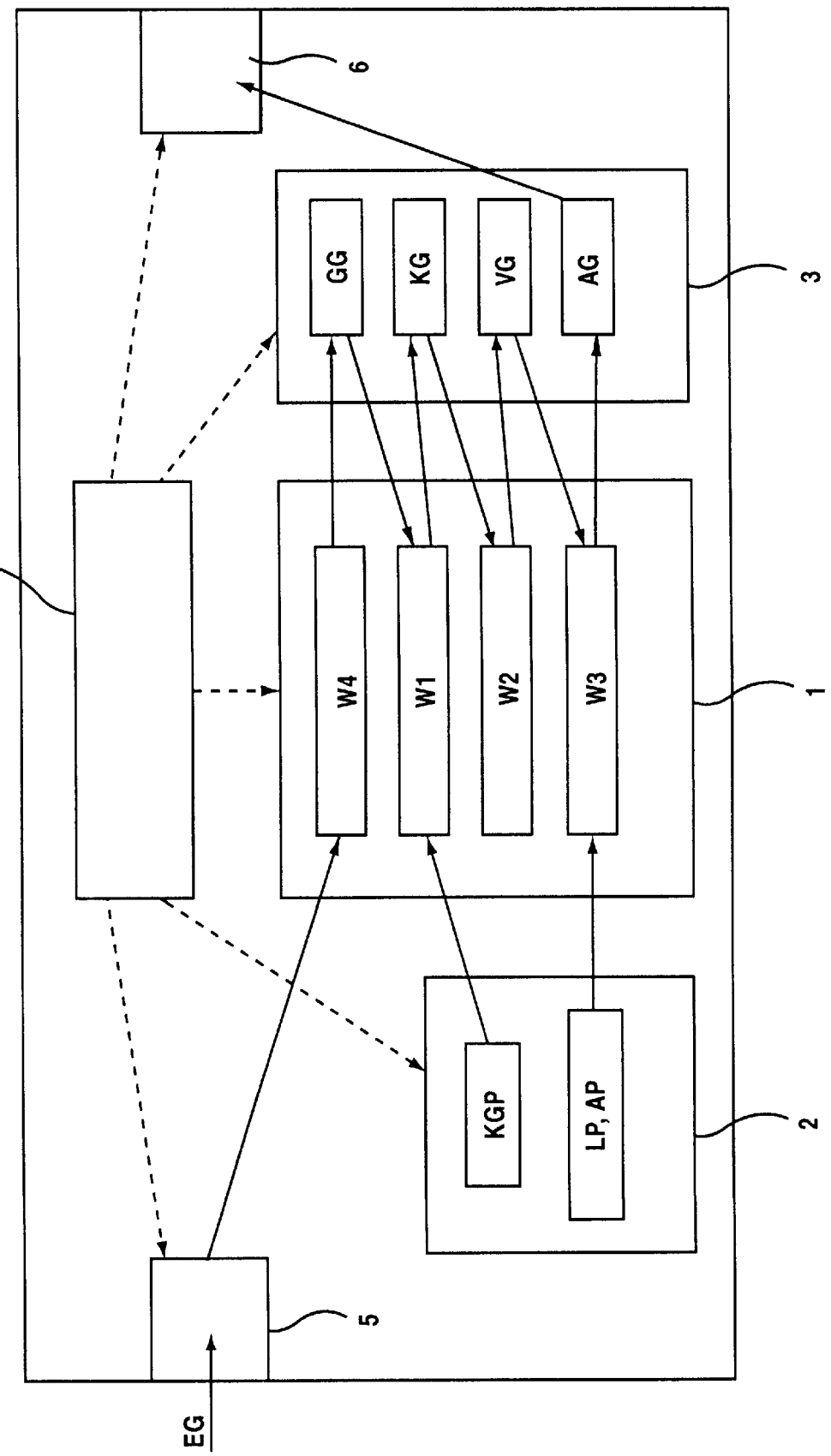
FIG. 1 is a schematic block diagram of a computing unit according to the invention.
Figure 4:
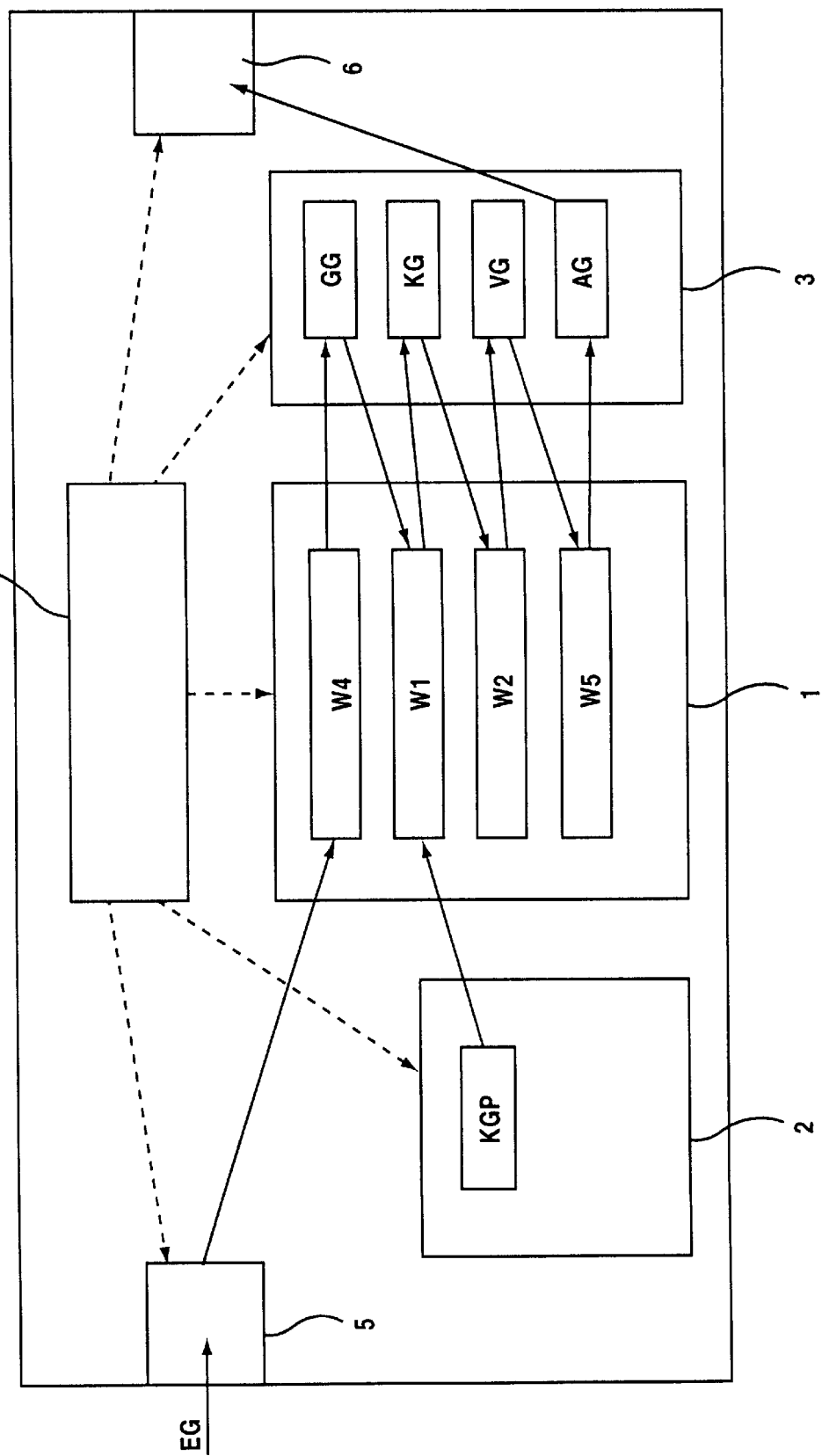
FIG. 4 is a schematic block diagram of a prior art computing unit.

The inventive computing unit according to FIG. 1 is explained with reference to its differences in comparison with the above-described prior art computing unit shown in FIG. 4. The components and variables that are structurally and functionally identical in the two computing units are labeled with identical reference symbols and will not be explained in any more detail.

Instead of the fifth processing specification VV5 in the form of a logic function, which is stored in the prior art computing unit in the first memory 1, in the inventive computing unit according to FIG. 1, a third processing specification VV3 in accordance with FIG. 2e is stored. In addition, the second memory 2 contains values of logic parameters LP1 to LP3 in accordance with FIG. 3. Furthermore, values of an output parameter AP are stored in the second memory 2. The number N of the logic parameters LP1 to LPN corresponds to the number N of the calculated comparison variables VG1 to VGN. The explanations of the introduction to the description relating to FIG. 4 should be used for the calculation of the comparison variables VG, of the characteristic variables KG and of the basic variables GG as well as for the assignment to the memories.

According to FIG. 3, each logic parameter LP and the output parameter AP is conceived as a vector LP[i] and AP[i] where $i=2^N$ coordinates. When the parameters LP and AP are represented according to FIG. 3, a table is thus obtained with the set of logic parameters LP1 to LPN and the output parameter AP as columns and the coordinates i as rows. In the table, each coordinate i of a parameter vector LP[i], AP[i] is assigned a binary value. Such a table is also referred to as a truth table. The table contains all the combinations of values which the set of logic parameters LP1 to LPN can assume. Each set of logic parameter values LP1[i] to LPN[i] with the same coordinate i is assigned a value of the logic output parameter AP[i] with the same coordinate i. The logic function according to FIG. 2b of the known computing unit is accordingly represented on a truth table according to FIG. 3. Here, each logic parameter LP is assigned to precisely one comparison variable VG so that the truth table according to FIG. 3b is obtained, for example, from the logic function specified in FIG. 2d. The output parameter AP is assigned to the output variable AG. The possible combinations of values of the logic parameters LP which lead to an output variable AG with the value TRUE are characterized in the rows with the coordinates i=4 to i=8 in the truth table according to FIG. 3b. The truth table according to FIG. 3a corresponds to a further logic function.

Each comparison variable VG is compared with in each case one assigned logic parameter LP using the third processing specification VV3 according to FIG. 2e, the truth table being processed row by row so that the set of comparison values VG1 to VGN is always compared with the set of logic parameters LP1 to LPN of the same coordinate i. If the comparison values VG which are determined agree with the set of logic parameters LP1[i] to LPN[i] of a specific coordinate i, the output variable AG is, according to the third processing specification VV3, assigned equal to the value of the output parameter AP which is assigned to this coordinate i.

However, the third processing specification VV3 which is described in FIG. 2e constitutes only one of a large number of possible implementations for comparing comparison variables VG and logic parameters LP. Starting with the first coordinate i of the truth table, the set of comparison variables VG1 to VGN is compared, row by row, with the set of logic parameters LP1 to LPN of one row and, if they agree (TRUE), the output variable AG is made equal to the value of the output parameter AP[i] in this row i. The variables introduced for the calculation are intermediate variables ZG and the comparison result VE. Instead of the logic function, a truth table (LP, AP) which represents the logic function is therefore stored in the second memory (2) of the computing unit. A processing specification (VV3) by means of which the calculated comparison variables (VG) are compared with the truth table (LP, AP) is stored in the first memory (1).

Any other desired search strategies may also be applied as the third processing specification VV3.

The truth table can furthermore also be changed to the effect that it has a number of coordinates i which is less than $2^N$. Only the assignment of logic parameters LP is stored in the remaining rows, said assignment supplying, for example, the value TRUE as output variable. Thus, if appropriate, the storage of values of an output parameter vector AP[i] may also be dispensed with, since the output variable AG always assumes the value TRUE if the set of comparison variables VG1 to VGN corresponds to a stored assignment of the set of logic parameters LP1 to LPN.

With regard to the formation of the various memories, it is to be noted that a nonvolatile memory is understood to be a memory whose memory contents are retained even when the operating voltage is lost. In the computing unit according to the invention, the term memory usually comprises a plurality of memory cells. The non volatile memory 2 which can be written to and read is preferably an EEPROM (Electrically Erasable Programmable Read Only Memory) and can thus be programmed electrically.

We claim:

1. A computing unit for a control device in a motor vehicle, comprising:

an input receiving an input variable and an output outputting an output variable for controlling a function of a motor vehicle in dependence on the input variable;

a first, nonvolatile, read-only memory having stored therein, on a basis of characteristic variables, first processing specifications for calculating characteristic variables as a function of one of the input variable and a characteristic-variable parameter, and second processing specifications for calculating logic comparison variables;

a second, nonvolatile memory capable of being written to and read from, said second memory having stored therein values of logic parameters; and said first memory having stored therein a third processing specification for comparing a respective logic comparison variable with a respective logic parameter for calculating the output variable.

2. The computing unit according to claim 1, wherein said first memory is a ROM.

3. The computing unit according to claim 1, wherein said second memory is an EPROM.

4. The computing unit according to claim 1, wherein said second memory is a EEPROM.

5. The computing unit according to claim 1, wherein the third processing specification has comparisons logically linked to one another by an AND operation, and wherein a result of the AND operation is assigned to the output variable.

6. The computing unit according to claim 1, which comprises a processor connected to said first memory and said second memory for executing the processing specifications, and a third, volatile memory capable of being written to and read from, said third memory being connected to said processor for storing results calculated by said processor.

7. The computing unit according to claim 1, wherein said output is connected to a safety device in a motor vehicle and an output signal with the output variable triggers a restraining device in the vehicle.

8. The computing unit according to claim 1, wherein the comparison variables, the logic parameters, and the output variable are binary variables.

9. The computing unit according to claim 8, wherein the values of the logic parameters and of the output parameter stored in said second memory form a complete truth table, each logic parameter vector and the output parameter vector having $2^N$ coordinates, where N is equal to a number of the logic parameters.

10. The computing unit according to claim 1, wherein each logic parameter is a vector with at least two coordinates.

11. The computing unit according to claim 10, wherein the logic output parameter is a vector with at least two coordinates.

12. The computing unit according to claim 1, wherein a logic output parameter is assigned to a set of logic parameters, and wherein said second memory has a value of the logic output parameter stored therein.

13. The computing unit according to claim 12, wherein the logic output parameter is a vector with at least two coordinates.

14. The computing unit according to claim 13, wherein the values of the logic parameters and of the output parameter stored in said second memory form at least part of a truth table.

15. The computing unit according to claim 14, wherein the third processing specification has comparisons logically linked to one another by an AND operation, wherein only comparisons between comparison variables and logic parameters of a same coordinate are taken into account, and wherein the output variable is assigned the value of the output parameter with the same coordinate if the result of the comparisons logically linked by AND operations is TRUE.

16. The computing unit according to claim 1, wherein each characteristic variable is dependent on one of at least one basic variable that depends on the input variable, and at least one characteristic-variable parameter.

17. The computing unit according to claim 16, wherein said second memory has stored therein the value of each characteristic-variable parameter.

18. The computing unit according to claim 16, wherein said first memory has stored therein a fourth processing specification for calculating each basic variable, wherein the basic variable is dependent on at least one input variable received by the computing unit.

19. The computing unit according to claim 18, wherein the input variable depends on the acceleration of the motor vehicle sensed by one or more acceleration sensors.

\* \* \* \* \*